Jan. 30, 1968    A. UHLIR, JR    3,366,875
MICROWAVE BRIDGE FOR MEASURING IMMITTANCES AND THE LIKE
Filed May 21, 1964    3 Sheets-Sheet 1

ARTHUR UHLIR, JR.
INVENTOR
BY
ATTORNEYS

Jan. 30, 1968   A. UHLIR, JR   3,366,875
MICROWAVE BRIDGE FOR MEASURING IMMITTANCES AND THE LIKE
Filed May 21, 1964   3 Sheets-Sheet 2

ARTHUR UHLIR, JR.
INVENTOR.
BY
ATTORNEYS

Jan. 30, 1968   A. UHLIR, JR   3,366,875
MICROWAVE BRIDGE FOR MEASURING IMMITTANCES AND THE LIKE
Filed May 21, 1964   3 Sheets-Sheet 3
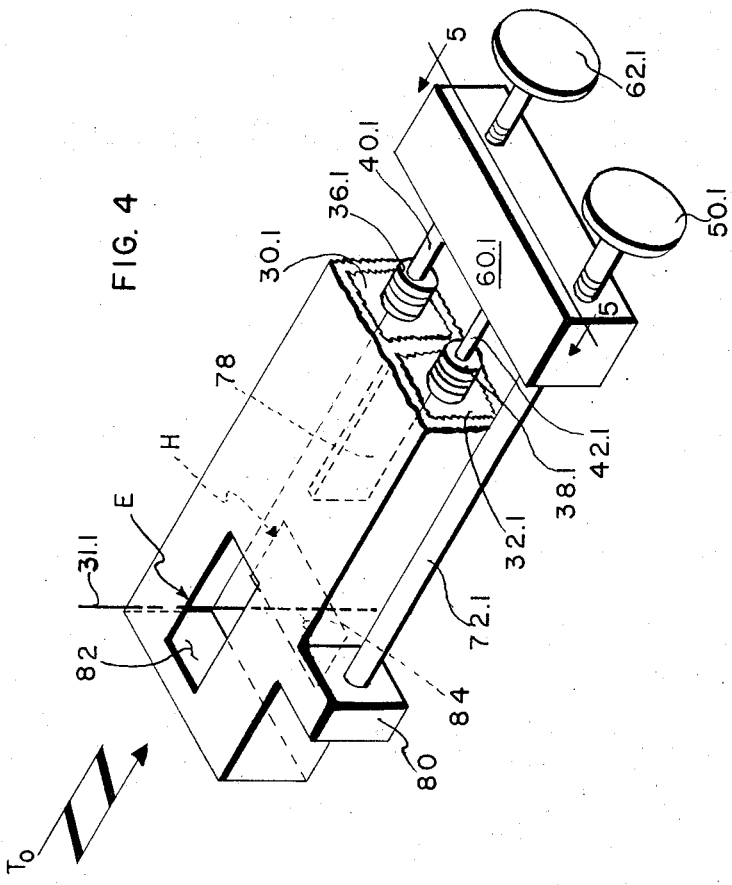
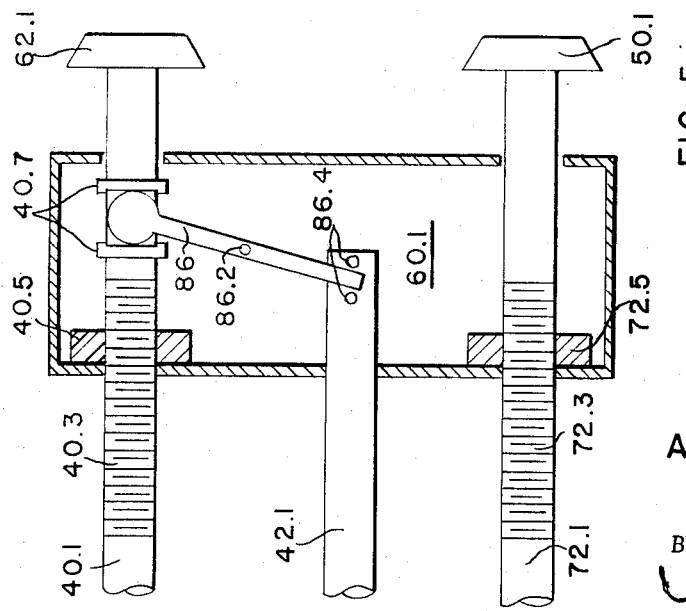
ARTHUR UHLIR, JR.
INVENTOR.
BY
ATTORNEYS

1

United States Patent Office 3,366,875
Patented Jan. 30, 1968

3,366,875
MICROWAVE BRIDGE FOR MEASURING
IMMITTANCES AND THE LIKE
Arthur Uhlir, Jr., Weston, Mass., assignor to Microwave
Associates, Incorporated, Burlington, Mass., a corporation of Massachusetts
Filed May 21, 1964, Ser. No. 369,209
7 Claims. (Cl. 324—58)

This invention relates in general to microwave testing equipment and more particularly to a bridge configuration using a pair of magic tee's, or the like.

In the microwave art, there is an important and long felt need for a simple mechanism capable of measuring impedances, admittance and reflection coefficient (collectively referred to as immittances) in for example, antennae and waveguides yet will also be capable of determining the microwave impedance of switching diodes during their transient change from one state to another and the comparison of the transient impedance with the static impedance obtained under bias conditions.

It is known that the standing wave ratio and the phase of the standing wave pattern, relative to any point along a microwave transmission line, determines the normalized impedance or admittance at that point. To arrive at a determination of the load impedance termination from these two data, the prior art had to resort to some form of impedance chart which shows how impedances transform along a line. The chart in principal use today is the complex Smith chart on which is plotted readings obtained from a slotted waveguide inserted in the line. The slotted section is placed before the termination and the Voltage Standing Wave Ratio (VSWR) is determined by noting current readings in a combination probe indicating device at minimum and at maximum voltage nodes.

The prior art system has many obvious defects not the least of which is the complexity of the Smith chart, as well as the time consuming effort required to plot and read the results. In addition, to arrive at a VSWR figure utilizing the Smith chart requires the assumption that the probe and the indicator device, as a whole, be perfectly square law. It is well known that this optimum condition may, at best, only be approached. Similarly, the insertion of an additional section of waveguide, even if only for measurement purposes, introduces certain discontinuities and errors that detract from the accuracy of the measurement.

A true bridge circuit has many advantageous features which, when applied to microwave frequencies becomes highly desirable. Basically, a bridge circuit involves the setting of at least two (and preferably only two) adjustments to produce a null. Such a null device, in microwave applications, has the distinct advantage in that the resulting null is essentially independent of the calibration of the associated attenuators and detectors and of the power level and amplitude stability of the generator. Thus, a true bridge provides more dependable and permanent calibrations than was previously possible with measuring apparatus involving the measurement of current, voltage or power level in slotted waveguide sections.

It is therefore a principal object of the present invention to provide a microwave bridge circuit utilizing magic tee's.

According to one embodiment of my invention, there is provided a pair of magic tee's each of which has four ports. In one embodiment one tee has a generator, a detector and a matched load connected to three of the ports while the fourth port represents the input to the second tee. This latter tee has two adjustable shorted sections in two of the ports lying in the plane of the input port while the unknown is connected to the fourth remaining port.

In another embodiment the positions of the matched termination in the first magic tee and the unknown termination in the second tee are reversed.

In still another embodiment an orthogonal tee is provided in place of the second magic tee.

The features of my invention which I believe to be novel are set forth with particularity in the appended claims. My invention itself, however, both as to its organization and method of operation, together with further features and advantages thereof may best be understood by reference to the following description taken in conjunction with the accompanying drawings, in which:

FIG. 4 is another embodiment, partially schematic showing how the principles of my invention may be utilized with an orthogonal magic tee; and FIG. 5 is a plan view, taken along lines 5—5 of FIG. 4 showing one method of imparting movement to the shorting elements as applied to an orthogonal magic tee.

Figure 1:
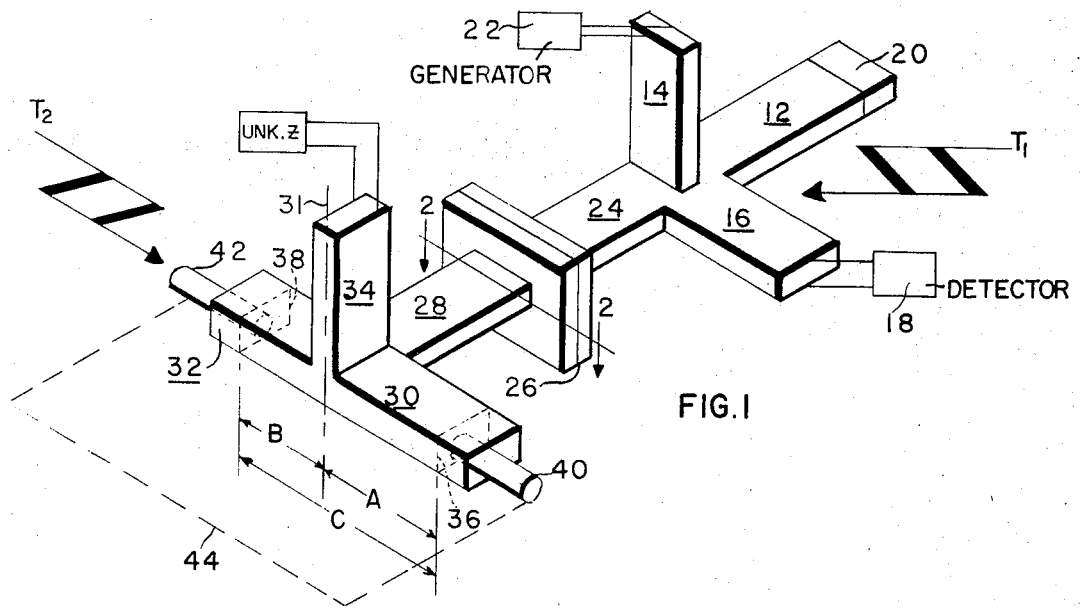
FIG. 1 is a perspective view, partially schematic, of one embodiment of a microwave bridge system utilizing the principles of my invention.

Referring now to FIG. 1 there is shown a first magic tee, $T_1$, consisting of two lengths of rectangular main waveguides 24 and 12, joined to form a common junction. Waveguide section 14 is joined to the common junction to form an E junction therewith, with waveguide section 16 also joined to the common junction forming an H junction. A signal is fed into the magic tee junction from, for example, generator 22 through waveguide 14, while detector 18 connected to the open-end of waveguide 16 may be utilized as a null detector. Under these conditions, the generated electric field attempts to excite the $TE_{02}$ mode in the tee junction to produce an output signal in branches 12 and 24.

In order for the junction to behave in the desired manner, branches 12 and 24 must be flat. That is, there must be no standing waves or reflected signals in these branches. When used as a directional coupler the magic tee has been found to be very sensitive in detecting reflected signals. Thus, any signal being fed into branch 14 will appear in the main waveguide section if either branch 12 or 24 has any reflected signals therein. If, however branch 12 is terminated in a given characteristics impedance 20, so long as branch 24 is terminated in its proper characteristic impedance, no signal will appear at the input to detector 18. If however either section 12 or section 24 is not properly terminated a reflected signal appears, a portion of which would reach the detector through branch 16. However the value of termination 20 is suitably chosen so that no reflected signals appear at detector 18 thereby indicating that section 24 is "looking into" a matched impedance.

Flange 26 is utilized to couple waveguide section 28 to waveguide section 24 of magic tee $T_1$ in magic tee $T_2$, section 28 forms an H junction at the common junction formed by the joining of waveguide sections 30 and 32, while waveguide section 34 forms the E junction at the common junction formed by joining waveguide sections 30 and 32. Adjustable shorting element or stub 38, shown in dotted configuration, is contained within the open end of waveguide section 32 and is adjusted by means of plunger 42, while a similar shorting element or stub 36 is arranged within the open end of waveguide section 30 and is adjusted by means of plunger 40. Both plungers 40 and 42 are ganged as shown by the dashed lines 44 which operation will be described hereinafter.

With an unknown termination connected to the open end of the waveguide section 34, plungers 40 and 42 may both be adjusted equal amounts (A and B) inwardly or equal amounts outwardly, toward or away from the common axis 31 formed at the E and H junction of tee 2, to adjust the phase of the signal reflected back into waveguide section 28. Once the distance C (spacing A+B, between shorting elements 36, 38) has been determined to achieve the proper phase relationship, the distances A and B may be varied simultaneously to achieve minimum voltage standing wave ratio (VSWR). That is, both shorting elements 36, 38 are shifted in opposite directions with respect to the common axis, while maintaining the previously determined phase spacing (dimenstion C). Thus elements 36, 38 both move toward or both move away from axis 31 to vary phase while to vary VSWR, element 36, for example, may move away from axis as element 38 moves an equal distance toward axis 31.

Figure 2:
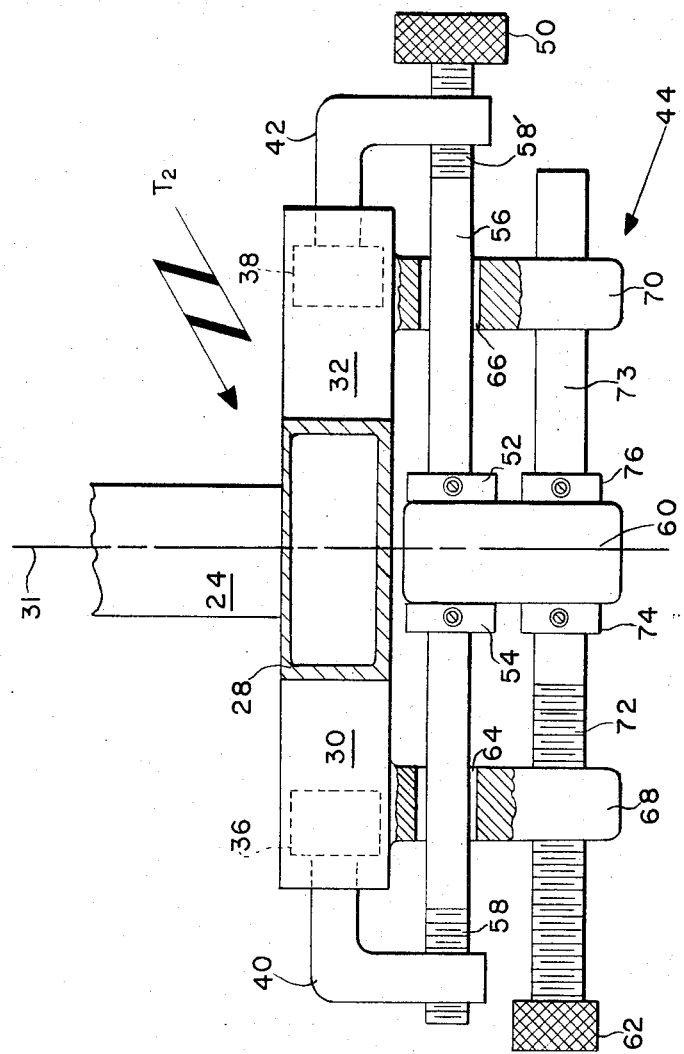
FIG. 2 is a view taken along lines 2—2 of FIG. 1 showing one form of tuning means.

As an example of the adjustment mechanism, reference is now made to FIG. 2, taken along lines 2—2 of FIG. 1, wherein similar elements are similarly numbered. Using the coupling means indicated, it will be seen that tuning plungers 40, and 42, connected respectively to shorting elements 38 and 36, may be moved in unison either inwardly or outwardly (toward or away from axis 31) by means of knob 50, to determine the distance C (FIG. 1). Rod 56 has a left-handed threaded portion 58 and a right-handed threaded portion 58′ formed thereon and is driven by knob 50. The internally threaded portions of plungers 40 and 42 (not shown) are provided for engagement with threaded portions 58 and 58′ respectively. Thus, as knob 50 is rotated, shorting elements 36 and 38 move together either toward each other or away from each other in waveguides 30 and 32, with respect to the imaginary axis 31 through waveguide sections 34, 28 depending on the rotation of knob 50. This adjustment, determines the phase of the reflected signal.

Collars 52 and 54 are fixed to threaded shaft 56 by means of set screws or the like, so as to maintain bushing 60 at approximately the center of rod 56. Pillars 68 and 70 are provided with apertures 64 and 66 through which rod 56 passes.

Shaft 73, having a threaded portion 72, is provided with a knob 62 to provide the VSWR capabilities. Pillar 70 provided with an upper aperture 66 for the passage of shaft 56, is also provided with a lower aperture (not shown) which is preferably threaded, through which shaft 73 passes. Similarly, the threaded portion 72 of shaft 73 is threaded through appropriate aperture in pillar 68.

Collars 74 and 76 are maintained on either side of bushing 60 so that, when knob 62 is rotated to produce the minimum VSWR, shorting elements 36 and 38 will be moved in unison either both to the right or both to the left, without disturbing the previously determined phase spacing (distance between elements 36 and 38). In the latter (VSWR) situation if, for example, element 36 is shifted away from the axis 31, element 38 is shifted an equal amount toward axis 31. This condition would also be applicable to a shifting of element 36 toward axis 31, in which case element 38 would be shifted an equal distance away from the axis.

Figure 3:
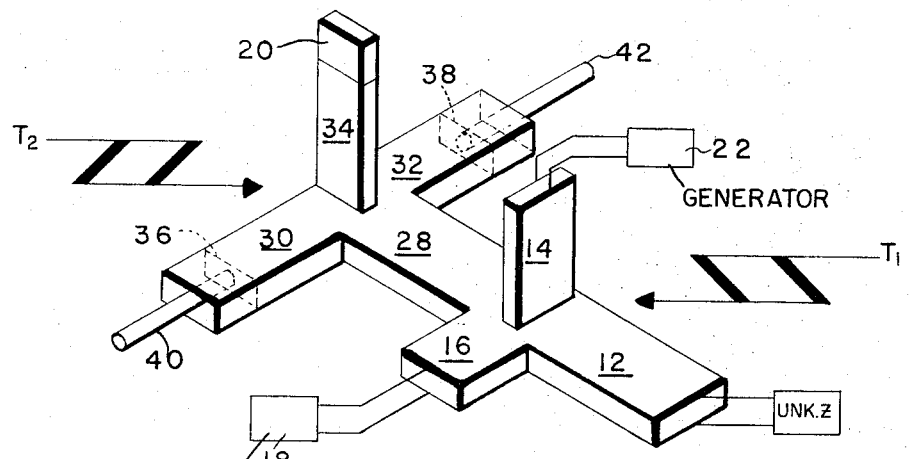
FIG. 3 is a perspective view partially schematic, of another embodiment of my microwave bridge.

Referring now to FIG. 3 there is shown another embodiment of my bridge circuit. It should be noted that this embodiment, is similar in many respects to the embodiment shown in FIG. 1 except that the flange 26, coupling magic tee 1 to magic tee 2, has been removed. In this latter embodiment the single waveguide 28 now couples the two tees. Similarly, the known or matched termination 20 of FIG. 1, originally appearing in waveguide 12 of tee 1 now appears as a matched termination in waveguide 34 of tee 2, with the unknown termination now appearing in the open end of waveguide 12 of tee 1. In all other respects, the elements of FIG. 1 are similar to the corresponding elements in FIG. 3. This embodiment readily suggests itself for situations where it may be inconvenient to terminate waveguide 34 with the unknown impedance.

It should also be noted that while dials for knobs 50 and 62 have been omitted for clarity, they may be added for the convenience of the operator to determine settings and for calibration purposes if necessary. Similary, micrometers may be substituted for knobs 50 and 62 for greater accuracy.

FIG. 4 is a perspective view partially schematic, of another embodiment of my microwave bridge having particular utility with the orthogonal or folded magic tee described in United States patent application Ser. No. 138,509, now Patent No. 3,192,489 and assigned to the assignee of the subject application. In this embodiment, waveguides 30.1 and 32.1 share a common wall or septum 78 which extends partially down the waveguide structure. At the termination of septum 78, there is formed a common junction between waveguide sections 30.1 and 32.1. At the common junction, an E window 82 is provided to which may be connected a suitable waveguide to form an E junction with the common junction. Similarly, on the other broad wall, an H window 84 is provided so that suitable section of waveguide may be connected thereto to form an H junction with the common junction.

As in the prior embodiment, tuning elements 36.1 and 38.1 are moved equally in certain prescribed directions and distances with respect to the common imaginary axis 31.1 extending through the common junction and through the E & H windows. Their relative positions are determined by the rotation of knob 62.1 which, is affixed to one end of rod 40.1. Rods 40.1 and 42.1 are internally coupled within coupling means 60.1 to impart the required movements to the individual rods as will be described hereinafter.

Thus, to adjust phase, tuning elements 36.1 and 38.1 are both moved toward axis 31.1 or both moved away from axis 31.1 in a manner comparable to the movement described in connection with FIG. 2.

The phase relationship is achieved by adjustment of 50.1 which is attached to one end of rod 72.1. Rod 72.1 has a threaded portion passing through the coupling means 60.1 and is attached for rotation at its other end to block 80.

However, to vary VSWR, it will be seen that as kob 62.1 is rotated, tuning elements 36.1 and 38.1 must move simultaneously, equal amounts so that as element 36.1 moves toward axis 31.1, element 38.1 moves an equal distance away from axis 31.1. Alternatively as element 36.1 moves away from axis 31.1, element 38.1 will move an equal amount toward axis 31.1.

Referring now to FIG. 5, for one means of accomplishing the movement in the orthogonal or folded magic tee of FIG. 4, there is shown rods 40.1 and 72.1 passing through the coupling means 60.1. As in FIG. 4, knob 62.1 attached to rod 40.1 for determining the VSWR relationship while knob 50.1 attached to rod 72.1 for determining the phase. Rod 40.1 is partially threaded, as indicated at 40.3, and engages suitable threaded means 40.5 which may be affixed to one wall of coupling means 60.1. Rod 40.1 also has a pair of collars 40.7 affixed between the threaded portion 40.3 and the knob 62.1 for engagement with coupling element 86. Rod 42.1 has the coupling means 86 coupled thereto at one end thereof by means of pins 86.4 while coupling means 86 is also made to pivot about point 86.2. The unpinned end of coupling means 86 may be forked to cooperate with the collars 40.7 as shown. Thus, as knob 62.1 is rotated, rods 40.1 and 42.1 will move in equal distances in an opposite direction depending upon the ratio of the arm 86. Once the VSWR relationship has been determined by the setting of knob 62.1 and rod 40.1 the whole assembly 60.1 may be moved by means of rotation of knob 50.1. Knob 50.1 has a threaded portion 72.3 on rod 72.1 which threaded portion engages an appropriate threaded means 72.5 which may be affixed to one wall of coupling means 60.1. Thus, rotation of knob 50.1 moves both tuning rods, 40.1 and 42.1, in unison, in the same direction and the same distance either toward or away from axis 31.1 (FIG. 4).

While I have described what is presently considered the preferred embodiment of my invention it will be obvious to those skilled in the art that various other changes and modifications may be made therein without departing from the inventive concept and, it is aimed in the appended claims to cover all such changes and modifications as fall within the true spirit and scope of my invention.

As an example of one such change, a ferrite circulator having three ports can, if desired, be substituted for the magic tee $T_1$ in FIGS. 1 and 3. As will be obvious to those skilled in the art, the generator 22, detector 18, and the input arm 28 of magic tee $T_2$ will be connected respectively to the three ports of the circulator, and as a result there will be no fourth port requiring a termination as in magic tee $T_1$.

What is claimed is:

1. A microwave impedance measuring system comprising: first and second magic tees each characterized by:
   (a) first and second hollow rectangular waveguide sections having respective corresponding characteristics oriented parallel to each other in all respects;
   (b) one end of one section joined to one end of the other section forming a common junction;
   (c) first and second open ends at respective other ends of the first and second waveguide sections;
   (d) third and fourth waveguide sections, and one end of one of the third and fourth sections joined to the common junction to form an E junction therewith, and one end of the other of the third and fourth sections joined to the common junction to form an H junction therewith;
   (e) third and fourth open ends at respective other ends of the third and fourth sections;
   first and second shorting means in the respective first and second open ends of the second magic tee;
   the first open end of the first magic tee connected to the fourth open end of the second magic tee;
   first impedance terminating means connected to the third open end of the second magic tee;
   second impedance terminating means connected to the second open end of the first magic tee;
   generator means connected to the third open end of the first magic tee; and
   detector means connected to the fourth open end of the first magic tee for measuring impedance of the system.

2. The impedance system of claim 1 further comprising:
   coupling means connected between the first and second shorting means to concurrently move the first shorting means a given distance in a first direction and simultaneously move the second shorting means the same given distance in a second direction opposite to the first direction.

3. The impedance measuring system of claim 2 further comprising:
   shifting means connected to both the first and second shorting means to simultaneously shift the position of both shorting means the same distance in the same direction.

4. A microwave impedance bridge comprising:
   first and second magic tee waveguide configurations each characterized by first waveguide means having first and second open ends, second waveguide means forming an E junction with the first waveguide means between the open ends thereof and third waveguide means forming an H junction with the first waveguide means between the open ends thereof;
   means coupling the first open end of the first magic tee to the third waveguide means of the second magic tee;
   variable shorting means located within the open ends of the second magic tee;
   generator means connected to the second waveguide means of the first magic tee;
   detector means connected to the third waveguide means of the first magic tee; and
   impedance terminating means for the remaining waveguide means.

5. A microwave impedance bridge comprising:
   first and second magic tees each having E and H junctions coupled between the ends of respective sections of open ended waveguides;
   means coupling one open end of the first magic tee as an input to the H-junction of the second magic tee;
   variable shorting means located within the open ends of the section of waveguide of the second magic tee;
   generator means connected to the E junction of the first magic tee;
   detector means connected to the H junction of the first magic tee; and
   means providing the other open end of the first tee and the E junction of the second tee with impedance terminating means.

6. A microwave impedance measuring system comprising:
   first and second hollow rectangular waveguide sections having respective corresponding characteristics oriented parallel to each other in all respects;
   one end of one section joined to one end of the other section forming a common junction;
   first and second open ends at respective other ends of the first and second waveguide sections;
   third and fourth waveguide sections, one end of one of the third and fourth sections joined to the common junction forming an E junction therewith and one end of the other of the third and fourth sections joined to the common junction forming an H junction therewith;
   third and fourth open ends at respective other ends of the third and fourth sections;
   first and second shorting means in the respective first and second open ends;
   impedance terminating means connected to the third open end; and
   circuit means connected to the fourth open end comprising:
   a four port magic tee having
       (a) a generator connected to a first port,
       (b) a detector means connected to a second port,
       (c) an impedance terminating means connected to a third port, and
       (d) the fourth port coupled to the fourth open end.

7. A microwave impedance measuring system comprising:
   first and second hollow rectangular waveguide sections sharing a common wall;
   one end of one section communicating with a corresponding end of the other section forming a common junction therewith;
   first and second open ends at respective other ends of the first and second waveguide sections;
   third and fourth waveguide sections, one end of one of the third and fourth sections joined to the common junction forming an E junction therewith and one end of the other of the third and fourth sections joined to the common junction forming an H junction therewith;
   third and fourth open ends at respective other ends of the third and fourth sections;
   first and second shorting means in the respective first and second open ends;
   impedance terminating means connected to the third open end; and
   circuit means connected to the fourth open end comprising a four port magic tee having:
       (a) a generator connected to a first port,
       (b) a detector means connected to a second port, (c) an impedance terminating means connected to a third port, and
(d) the fourth port coupled to the fourth open end.

References Cited

UNITED STATES PATENTS

| | | | |
|---|---|---|---|
| 2,682,033 | 6/1954 | Smullin | 324—58 |
| 2,684,467 | 7/1954 | Young et al. | 324—58 |
| 2,790,143 | 4/1957 | Kyhl | 324—58 |
| 2,819,453 | 1/1958 | Cohn | 324—58 X |
| 2,867,773 | 1/1959 | Korman | 333—11 |
| 3,192,489 | 6/1965 | Walker et al. | 333—11 |
| 3,196,371 | 7/1965 | Marie | 333—11 X |

RUDOLPH V. ROLINEC, Primary Examiner.
WALTER L. CARLSON, Examiner.
P. F. WILLE, Assistant Examiner.